Oct. 22, 1963 B. B. ELLIS 3,107,415
METHOD OF MAKING A MAGNETIC CORE
Original Filed Dec. 11, 1957 2 Sheets-Sheet 1
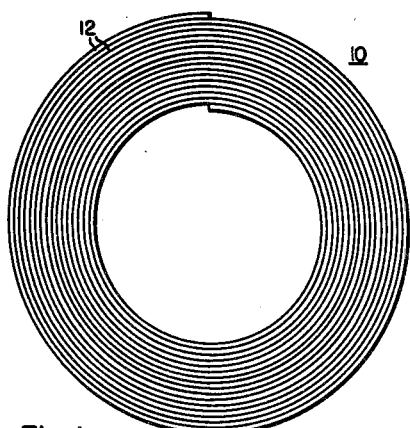
Fig.1.
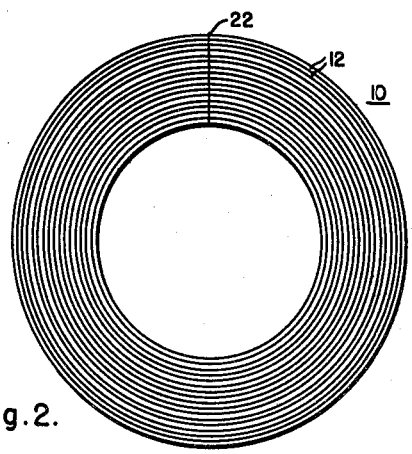
Fig.2.
Fig.3.
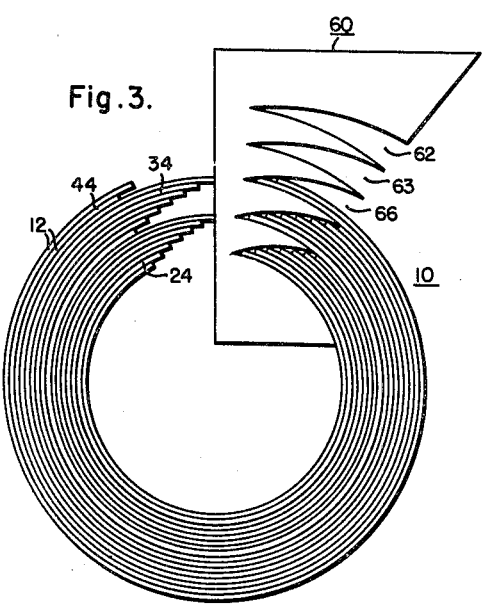
Fig.4.
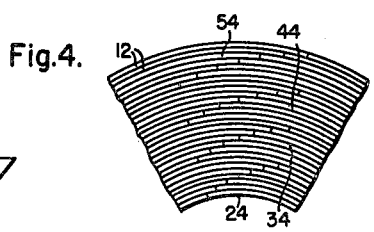
Fig.5.
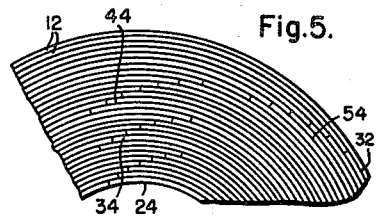
Fig.6.
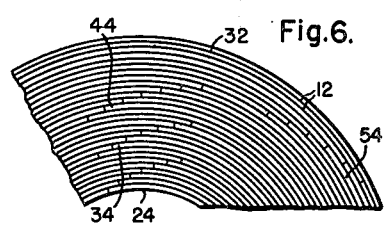
WITNESSES:
Clement L. McHale
James F. Young
INVENTOR
Belvin B. Ellis
BY F. E. Browder
ATTORNEY Oct. 22, 1963   B. B. ELLIS   3,107,415
METHOD OF MAKING A MAGNETIC CORE
Original Filed Dec. 11, 1957
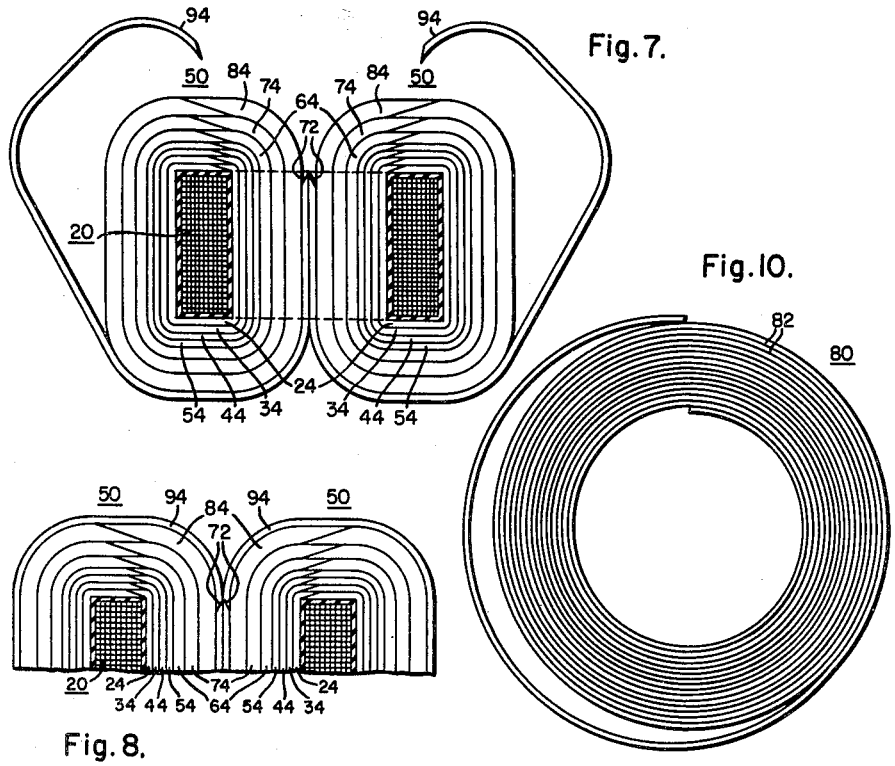
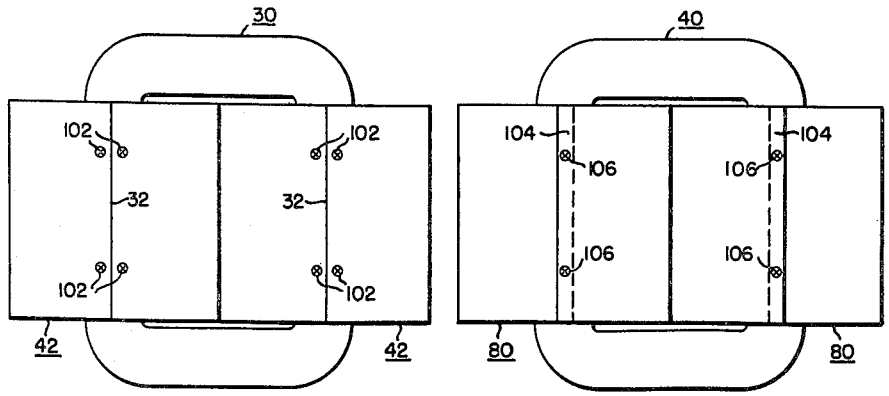

United States Patent Office 3,107,415
Patented Oct. 22, 1963

3,107,415
METHOD OF MAKING A MAGNETIC CORE
Belvin B. Ellis, Lackawanna Township, Mercer County, Pa., assignor to Westinghouse Electric Corporation, East Pittsburgh, Pa., a corporation of Pennsylvania
Original application Dec. 11, 1957, Ser. No. 702,096. Divided and this application Jan. 19, 1960, Ser. No. 3,374
6 Claims. (Cl. 29—155.58)

This invention relates to wound type magnetic cores and more particularly to improvements in such cores, and the method of making the cores.

This application is a division of my application Serial No. 702,096, filed December 11, 1957, and assigned to the same assignee as this application.

In the making of a core and coil assembly for inductive apparatus, two or more wound type cores, each effectively cut only once through the laminations, are sometimes fitted through the window of a preformed winding or coil. In order to allow the outer laminations of each core to be conveniently fitted through the window of the preformed winding, it is necessary that a predetermined amount of space be left between the cores fitted through the window. The latter arrangement reduces the amount of space that can be utilized within the window of the preformed winding or coil. In addition, if only a small space is left between the cores fitted into the window of the preformed winding, it is found that the outer laminations of each core may be deformed in order to fit the outer laminations of each core through the window of the preformed winding. Any deformation of the outer laminations results in at least a small increase in the losses of a wound type core. Fitting the outer laminations of each core through the window of the preformed winding also presents difficulties in the making of core and coil assemblies since the fitting may have to be done manually which requires additional time and care in the manufacture of a core and coil assembly. It is, therefore, desirable to provide a wound type core which can be conveniently fitted through the window of a preformed winding and yet more fully utilize the space in the window of a preformed winding to obtain a maximum space factor in the core and coil assembly and thereby also reduce the conductor requirements in the preformed coil.

It is, therefore, an object of this invention to provide a new and improved wound type core for inductive apparatus.

Another object of this invention is to provide a new and improved method of making a wound type magnetic core.

A further object of this invention is to provide a new and improved joint in a wound type core suitable for assembly with a preformed winding or coil.

Other objects of the invention will in part be obvious and will in part appear hereinafter.

The invention, accordingly, comprises the several steps and the relation and order of one or more of such steps with respect to each of the others, and the apparatus embodying the features of construction, properties, and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings, in which:

FIGURE 1 is a view in end elevation showing how the turns of a core are wound in accordance with this invention;

FIG. 2 is a view in end elevation of the core shown in FIG. 1 with the turns cut to provide independent laminations;

FIG. 3 is a view in end elevation of the core showing how the laminations are arranged in stepped relationship;

FIG. 4 is a fragmentary view showing the laminations separated into groups with the ends disposed in stepped relationship;

FIG. 5 is a fragmentary view showing the joints of the outermost group of laminations of a core displaced relative to the joints of the inner groups;

FIG. 6 is a fragmentary view showing a second embodiment of a core in which the joint of the outermost lamination of the core is displaced relative to the joints of the outermost group of laminations;

FIG. 7 is a view partly in section and partly in side elevation of a core and coil assembly showing how the cores may be fitted through the window of a preformed winding or coil after a core constructed as shown in FIG. 5 has been shaped;

FIG. 8 is a fragmentary view showing a core and coil assembly completely assembled after the last group of laminations of each core shown in FIG. 7 has been fitted through the window of a preformed winding;

FIG. 9 is a top view of a core and coil assembly, including cores constructed in accordance with FIG. 6, with the outermost laminations of each core secured to the next adjacent lamination;

FIG. 10 is a view in end elevation of a third embodiment of a core similar to the core shown in FIG. 1 except that the outermost lamination is provided with an overlapping portion which remains after the turns of the core are cut; and FIG. 11 is a top view of a core and coil assembly including a core having an outermost lamination with an overlapping portion constructed in accordance with FIG. 10.

Referring now to the drawings and FIG. 1 in particular, a wound type core is shown generally at 10 having a plurality of turns 12 of oriented magnetic strip material wound on one another. The core 10 has a predetermined number of turns of magnetic strip material wound in a closed loop which preferably has substantially a ring shape, but may have any other desired shape in a closed loop which need not be circular, as illustrated. The thickness and width of the magnetic strip and the number of turns are determined by the necessary capacity of the final core and the dimensions of the preformed winding with which the core is to be assembled.

The core 10 shown in FIG. 1 may be wound by any of several, well-known suitable means. The core 10 may be annealed after it is wound in substantially a ring shape as shown or alternatively, the turns of the core may be retained in the ring shape or closed loop by any suitable means, such as precurving during the winding of the core.

Referring to FIG. 2, the core 10 is next cut or severed along a line 22 substantially at right angles to the turns 12 to provide independent laminations 12, which are equal in number to the number of turns in the core 10 before it is cut, in order that the core 10 may be fitted through the window of a preformed winding.

In order to prevent spreading by formation of burrs during cutting of the core 10, it has been found necessary to clamp the core 10 near the line 22 on each side by suitable means (not shown). If the core 12 has substantially a ring shape as illustrated, the cut along the line 22 would be along a diameter of the ring-shaped core 10, but the cut along the line 22 may be varied somewhat to meet a special purpose in a particular core embodying this invention.

Referring to FIG. 3, after the core 10 is cut, the laminations 12 of the core 10 are separated into groups by any suitable means such as the fixture or jig 60 having a plurality of curved grooves or recesses 62, 63 and 66 in order to arrange the cut ends of the laminations 12 in a desired pattern. As illustrated, the laminations 12 of the core 10 are shown partially arranged into three groups 24, 34, and 44, each group having a plurality of laminations disposed with the ends of each lamination offset or displaced from the cut ends of the adjacent lamination in a stepped relationship. Each lamination of the core 10 forms a joint which is offset or staggered with respect to the joint in each adjacent lamination. The cut ends of each lamination lap the cut ends of each adjacent lamination. The end portion of each lamination overlaps the end portion of the next adjacent lamination to form a joint which may be described as a stepped-lap joint because of the manner in which the cut ends of the laminations are disposed.

Referring to FIG. 4, after all of the laminations 12 of the core 10 have been arranged in groups with the cut ends of the laminations 12 in stepped relationship, the groups 24, 34, 44 and 54 of the laminations 12 are then assembled to make a series of stepped-lap joints in a closed core. The groups of the laminations 12 may be arranged in a recurring pattern as shown in FIG. 4. The number of laminations 12 in each group need not be the same and may be varied to suit particular design requirements. Each of the groups 24, 34, 44 and 54, as illustrated, preferably consists of at least seven individual laminations. The cut ends of each of the laminations 12 are substantially aligned with one another forming a joint that is offset or staggered with respect to the joint in the adjacent lamination in the order of 5 to 10 times the thickness of each lamination to form a stepped joint in each group whose length is preferably substantial compared to the thickness of the core. As illustrated in FIG. 4, the groups 24, 34, 44 and 54 are superimposed on one another forming an overall stepped joint that extends through a substantial sector of the core. The cut ends of the laminations 12 may abut one another as illustrated, but this is not essential to the core since satisfactory results have been obtained with the cut ends of each lamination spaced from one another by a distance equal to the thickness of one or two of the laminations 12. The ends of the laminations 12 should overlap one another by a substantial amount, preferably by a distance equal to or in excess of six times the thickness of one of the laminations 12.

It is to be noted that the ratio of the overlapping distance to the thickness of a lamination may be varied in a particular application to obtain a more balanced magnetic reluctance from the inside of the core to the outside of the core by making the ratio progressively larger from the innermost group to the outermost group of laminations. This would compensate for the variation in the length of the laminations from the inside to the outside of the core.

Referring to FIG. 5, after the groups of laminations 12 have been assembled as shown in FIG. 4, at least one of the outermost groups of laminations, such as the group 54, is displaced or shifted by a predetermined amount or distance relative to the joints of the inner groups of the laminations 12 which include the balance or rest of the groups 24, 34 and 44. As will be explained hereinafter, the amount or distance that the group 54 is displaced will depend on the desired location of the joints or the outermost group or groups of laminations on the final shaped core. Several steps in obtaining the arrangement of the laminations 12 shown in FIG. 5, may be combined by substituting a special fixture or jig (not shown) for the fixture 60 shown in FIG. 3, the special fixture having the outermost group or groups separated by a disproportionate amount from the other groups in the special fixture (not shown) in order that at least the joints of one of the outermost groups be displaced relative to the joints of the inner groups as shown in FIG. 5. The latter method would allow at least the joints of one of the outermost groups to be displaced or shifted in one direction for a particular prior arrangement of the groups relative to the joints in the balance of the groups.

Referring to FIG. 6, a second embodiment of a core embodying the teachings of this invention is illustrated in which the joint in the outermost of the laminations 12 is displaced or shifted relative to the joints of the displaced group or groups shown in FIG. 5. In particular, the cut ends of the outermost of the laminations 12 shown at the line 32 is shifted back to its original position before the outer group 54 is displaced. For reasons which will be explained hereinafter, the cut ends of the outermost of the laminations 12 will then be disposed or located on the same portion of the final shaped core as the inner groups 24, 34 and 44 whose joints were not displaced.

After the groups of the laminations 12 have been assembled as shown in FIG. 5, the core is next shaped to a predetermined shape suitable for assembly with a preformed winding (not shown). The core is usually shaped to a substantially rectangular shape as shown in FIG. 7. After the core is shaped, it will be annealed to relieve stresses set up in the core by the shaping step by any of several suitable means which are well-known in the art. After the core has been shaped and annealed, the core is disassembled to the extent necessary to fit the core through the window of a preformed winding or coil. Disassembly of the core is facilitated by the fact that bonding of the laminations is not required. It has also been found that it is unnecessary to work the cut ends of the laminations to remove burrs since any burrs present would be disposed in contact with an insulating layer provided on the magnetic strip material used to wind the core.

Referring to FIG. 7, the manner in which two cores constructed in accordance with this invention are fitted through the window of a preformed winding or coil 20 is illustrated. Each of the cores 50 includes a plurality of groups 24, 34, 44, 54, 64, 74, 84 and 94 of laminations. All of the groups except the outermost group 94 are shown already fitted through the window of the preformed winding 20, the step joint in all of the groups except the outermost group 94 being disposed or located on the yoke of each of the cores 50. The cut ends of the laminations of the outermost group 94 which are shown generally at the lines 72 were displaced from the joints of the rest of the groups of the laminations in each of the cores 50 in a similar manner to that shown in FIG. 5. By displacing the step joint of the outermost group 94 relative to the step joint in the balance of the groups, the cut ends or joints of the laminations in the outermost group 94 are disposed or located, as shown, on a leg of each of the cores 50.

Referring to FIG. 8, the complete core and coil assembly including the cores 50 and the preformed winding 20 is illustrated after the outermost group 94 has been fitted in the window of the preformed winding 20. It is to be noted that an overall joint is obtained in which the step joints of the groups of laminations are divided or distributed between the yoke and leg portions of each of the cores 50. The slope of the cut ends of the laminations of the outermost groups 94 disposed on a leg of each of the cores 50 may be in either direction, the preferred slope being as shown in order that a flat plate or shim (not shown) may be used to fit the cut ends of the outermost group 94 of displaced laminations into the window of the preformed winding 20. Any flat plate or shim (not shown) used to fit the outermost group 94 into the window of the preformed winding 20 would be removed after assembly of the cores 50 and the winding 20. After the cores 50 and the preformed winding 20 have been completely assembled as shown in FIG. 8, any suitable means may be provided, such as a band (not shown), around each of the cores 50 to maintain the shape of each of the cores 50.

It has been found that deformation of the outer groups of laminations is substantially eliminated in the fitting of these laminations through the window of a preformed winding 20 such as illustrated in FIGS. 7 and 8. This is because the stepped joint of the outermost group 94 of the cores 50 is disposed on a leg of each core and may be fitted through the window of the preformed winding 20 without difficulty or bending and without the usual space between the cores such as required in a conventional core and coil assembly of this type. Thus, the space in the window of the preformed winding 20 is utilized to a maximum degree with a resulting economy in the amount of conductor required for the preformed winding 20. Also the losses of a core constructed as illustrated in FIGS. 7 and 8 are reduced because of the absence of deformation of the outermost group or groups of laminations disposed on the inner legs of the cores 50.

It is to be understood that although the core and coil assembly shown in FIGS. 7 and 8 are illustrated with only one outer group displaced so as to be located or disposed on the legs of the cores 50, a core embodying this invention could be constructed with two or more of the outermost groups disposed on a leg of a core similar to the cores illustrated in FIGS. 7 and 8. It is also to be understood that the outer groups 94 which are each disposed on an inner leg of the cores 50 could be disposed on the outer legs of the cores 50 rather than on the inner legs as illustrated in FIGS. 7 and 8. In addition, a core embodying the teachings of this invention could be provided in which the outer displaced group or groups could be disposed on the yoke of the core and the balance of the inner groups disposed on a leg or legs of the core by properly arranging the joints of the laminations of the core before it is finally shaped. The arrangement shown in FIGS. 7 and 8 is preferred, however, for convenience in the making of core and coil assemblies as illustrated and allows easier inspection of the major portion of the joint during assembly of the cores 50 and the winding 20.

Referring to FIG. 9, a core and coil assembly is illustrated including a preformed winding or coil 30 and the cores 42 which have been constructed in accordance with the arrangement shown in FIG. 6. In this embodiment of the invention, the cut ends of the outermost lamination on each of the cores 42 is disposed on the yoke of each of the cores after the cores are finally shaped as indicated generally along the line 32 on each of the cores 42. Except for the outermost lamination of each of the cores 42, the making of the cores 42 would be similar to the steps already described for the cores 50 shown in FIGS. 7 and 8. In the embodiment shown in FIG. 9, however, the outermost lamination is disposed with the cut ends of the outermost lamination on the yoke of each of the cores 42 so that the outermost lamination may be secured to the next adjacent lamination thereby maintaining the shape of the cores 42 after the cores and the preformed winding 30 are completely assembled. In this instance, the outermost lamination of each of the cores 42 is secured to the next adjacent lamination by the spot welds 102 which are disposed on each side of the cut ends of the outermost lamination of each of the cores 42. In this embodiment of the invention, therefore, it is not necessary to provide a separate means for maintaining the shape of the cores 42 after they have been fitted through the window of the preformed winding 30. It is to be understood that means other than spot welds may be employed to secure the cut ends of the outermost lamination of the cores 42, such as a suitable tape.

Referring to FIGS. 10 and 11, a third embodiment of a core which incorporates the teachings of this invention is illustrated. The making of the cores 80 shown in FIG. 10 differs from the making of the cores 50 shown in FIGS. 7 and 8 in that, prior to the cutting of the turns 82 of each of the cores 80, the outermost turn is pulled back from the rest of the turns 82 as illustrated in FIG. 10. The core 80 is then cut along a diameter at substantially right angles to the turns 82 leaving the outermost lamination of the core 80 with a portion that overlaps the cut ends of the rest of the laminations 82 of the core 80. The overlapping portion of the outermost lamination of the core 80 is indicated at 104 in FIG. 11. The additional steps in making the core 80 are the same as previously discussed for the cores 50 shown in FIGS. 7 and 8.

Referring to FIG. 11, a core and coil assembly including a preformed winding 40 and the cores 80 constructed as indicated in FIG. 10 is illustrated. The overlapping portion 104 of the outermost lamination of each of the cores 80 is secured to the next adjacent lamination by the spot welds 106. The latter arrangement also eliminates the need for separate means such as bands for maintaining the shape of the cores 80 after they have been fitted through the window of the preformed winding 40. The embodiment shown in FIGS. 10 and 11 requires less spot welds to secure the outermost lamination to the next adjacent lamination than the embodiment shown in FIGS. 6 and 9. It is to be understood that the overlapping portion 104 which is shown as disposed on the yoke of the core 80 might also be conveniently located on the legs of the cores 80 in a particular design.

It will be readily appreciated that a magnetic core embodying the teachings of this invention may be constructed by means other than winding magnetic material. For example, magnetic material which has been cut or sheared into punchings of various lengths which are then shaped as required may be assembled into a core as shown in FIG. 8.

It is to be understood that the arrangement of laminations shown in FIG. 6 may be obtained directly from the arrangement of laminations shown in FIG. 4 by displacing all of the laminations 12 in the outermost group 54 except for the outermost lamination of the group 54 whose cut ends are shown at 32 in FIG. 6. It is also to be understood that a core embodying the teachings of this invention could be constructed having only one group of laminations arranged to form a series of step-lapped joints. In this case the joints of at least a portion of the outermost laminations would be shifted or displaced relative to the joints of the inner laminations so that after the core was finally shaped the joints in the laminations would be divided or distributed between the yoke and legs of the core. In addition, a core embodying the teachings of this invention preferably includes only one overall cut of the turns, but the core may include additional cuts with a corresponding increase in the losses. One cut per core would normally be used for a shell form type transformer designed as shown in FIG. 9 and two cuts would normally be used with a core form transformer (not shown) which has one core and two windings.

The apparatus embodying the teachings of this invention has several advantages, for example, a wound type core embodying the teachings of this invention, with groups of laminations distributed between the yoke and legs of the core, eliminates the space between two cores fitted into the window of a preformed winding thereby improving the space factor and reducing the amount of conductor required for the preformed winding. In addition, the outer laminations can be more easily fitted into the window of a preformed winding substantially eliminating the deformation of the outer laminations, and thus substantially eliminating the increase in core losses which result from deformation of the outer laminations. A core embodying the teachings of the invention shown in FIGS. 9 and 11 would have an additional advantage of not requiring a separate means, such as a band, for maintaining the shape of the core after the core has been fitted into the window of a preformed winding.

A core constructed in accordance with this invention permits convenient clamping during manufacture. The weight of the coil also assists in maintaining the joint after assembly. Easier inspection of most of the joint is also possible during assembly. The core combines the advantages of allowing convenient assembly of most of the groups of laminations on the yoke portion while there is ample room and convenient assembly of the outermost laminations on the leg portion when there is less room available to thereby prevent deformation of the outermost laminations.

It has also been found that a core having only one cut, constructed in accordance with the teachings of this invention is an extremely low loss core with a very low exciting current and with a very low sound level.

Since numerous changes in carrying out the above described process and certain modifications in the apparatus which embody the invention may be made without departing from the spirit thereof, it is intended that all the matter contained in the foregoing description or shown in the accompanying drawings shall be interpreted as illustrative and not in a limiting sense.

I claim as my invention:

1. The method of making a magnetic core for use in a preformed coil, comprising the steps of, winding a predetermined number of turns of oriented magnetic strip material to form a core loop, cutting the core loop along a line at substantially right angles to the turns to provide independent laminations, so arranging the laminations in a plurality of groups superimposed on each other in a recurring pattern that each group has a plurality of laminations disposed with the ends of each lamination displaced from the ends of each adjacent lamination in a stepped relation, assembling the groups of laminations with stepped ends to make stepped-lap joints in a closed core, displacing the joints of the outer group a predetermined distance relative to the joints of the inner groups, so shaping the core to a predetermined shape having a yoke and legs that the joints of said groups are divided with the joints of the inner groups on the yoke and with the joints of the outer group on the inner leg of said core when the core is assembled in the window of a coil, and annealing the shaped core to relieve stresses.

2. The method of making a magnetic core for use in a preformed coil comprising the steps of, winding a plurality of turns of oriented magnetic strip to form a closed loop, cutting the core along a line substantially at right angles to the turns to provide independent laminations, displacing the cut in each turn with respect to the cut in each adjacent turn, so arranging the individual turns with the cut ends of each turn opposite each other and with the cut in each turn overlapping the cut in each adjacent turn that the cuts provide a stepped joint in the core, displacing the cuts in the outer turns relative to the cuts in the inner turns, so shaping the core to a desired shape having a yoke and legs that the displaced cuts in the outer turns and the cuts in the inner turns are divided with the joints of the inner turns on the yoke and with the joints of the outer turns on the inner leg of said core when the core is assembled in the window of a coil, with most of said joints being in said yoke, and annealing the shaped core to relieve stresses.

3. The method of making a magnetic core comprising the steps of, winding a plurality of turns of oriented magnetic strip to form a closed loop, cutting the core along a line substantially at right angles to the turns to provide independent laminations, displacing the cut in each turn with respect to the cut in each adjacent turn, so arranging the individual turns with the cut ends of each turn opposite each other and with the cut in each turn overlapping the cut in each adjacent turn that the cuts provide a stepped joint in the core, displacing the cuts in the outer turns relative to the cuts in the inner turns, said outer turns being less in number than said inner turns, so shaping the core to a desired shape having a yoke and legs that the displaced cuts in the outer turns are on the inner leg of said core when the core is assembled in the window of a coil and the cuts in the inner turns are on the yoke, and annealing the shaped core to relieve stresses.

4. The method of making a magnetic core comprising the steps of winding a plurality of turns of oriented magnetic strip material to form a core loop, displacing the outermost turn to leave a predetermined space between said outermost turn and the balance of said turns, cutting the core loop along a line substantially at right angles to the turns to provide independent laminations, pulling the outermost lamination tight to close the space between said outermost lamination and the rest of said laminations with a portion of the outermost lamination overlapping the cut ends of the rest of said laminations, so arranging the laminations in a plurality of groups that each group has a plurality of laminations disposed with the cut ends of each lamination displaced from the cut ends of the adjacent lamination in a stepped relationship, assembling the groups of laminations with stepped ends to make stepped-lap joints with the ends of the groups in substantial alignment, displacing the joints of the outer group a predetermined distance relative to the joints of the rest of said groups, so shaping the core to a predetermined shape having a yoke and legs that the joints of said inner groups are on the yoke and the joints of the outer group are on the inner leg of said core when the core is assembled in the window of a coil, annealing said core to relieve stresses, and securing the overlapping portion of said outermost lamination to the adjacent lamination.

5. The method of making a core and coil assembly for inductive apparatus, comprising the steps of, winding a coil to a predetermined shape having a window for receiving a core, winding a plurality of turns of oriented magnetic strip material to form a substantially ring-shaped core, cutting the ring-shaped core along a diameter of the ring-shaped core to provide independent laminations equal in number to the number of turns in the core, so arranging the laminations into a plurality of groups that each group has a plurality of laminations disposed with the ends of each lamination displaced from the ends of the adjacent lamination in a stepped relationship, assembling the groups of laminations with stepped ends to make stepped-lap joints in a closed core, displacing the joints of the outer group relative to the joints of the balance of the groups, so shaping the core to a predetermined shape having a yoke and legs that the joints of the displaced group are disposed on the inner leg of said core when the core is assembled in the window of a coil and the joints of the rest of said groups are disposed on the yoke of said core, disassembling the shaped core in groups of laminations, and reassembling said groups of laminations in the window of said coil with the ends of each lamination in substantial alignment with each other.

6. The method of making a core and coil assembly for inductive apparatus having two adjacent cores for one coil, comprising the steps of, winding a coil to a predetermined shape having a window for receiving the cores, making each core by winding a plurality of turns of oriented magnetic strip material to form a substantially ring-shaped core, cutting the ring-shaped core along a diameter of the ring-shaped core to provide independent laminations equal in number to the number of turns in the core, so arranging the laminations into a plurality of groups that each group has a plurality of laminations disposed with the ends of each lamination displaced from the ends of the adjacent lamination in a stepped relationship, assembling the groups of laminations with stepped ends to make stepped-lap joints in a closed core, displacing the joints of the outer group relative to the joints of the balance of the groups, so shaping the core to a predetermined shape having a yoke and legs that the joints of the outer group are disposed on the inner leg of said core and the joints of the rest of said groups are disposed on the yoke of said core, annealing the shaped core to relieve stresses, disassembling the shaped cores in groups of laminations, and reassembling said groups of laminations for each core in the window of said coil with the ends of each lamination in substantial alignment with each other and the legs of the cores having the joints of the displaced groups thereon adjacent each other.

References Cited in the file of this patent

UNITED STATES PATENTS

| | | |
|---|---|---|
| 1,935,426 | Acly | Nov. 14, 1933 |
| 2,288,855 | Steinmayer et al. | July 7, 1942 |
| 2,484,214 | Ford et al. | Oct. 11, 1949 |
| 2,931,993 | Dornbush | Apr. 5, 1960 |
| 2,960,756 | Treanor | Nov. 22, 1960 |
| 2,972,804 | Ellis | Feb. 28, 1961 |

FOREIGN PATENTS

| | | |
|---|---|---|
| 624,137 | Great Britain | May 27, 1949 |